United States Patent
Klein et al.

(10) Patent No.: US 10,177,664 B2
(45) Date of Patent: Jan. 8, 2019

(54) SWITCHING POWER CONVERTER WITH A MAXIMUM CURRENT MODE CONTROL

(71) Applicant: THALES, Courbevoie (FR)

(72) Inventors: François Klein, Valence (FR); Christophe Taurand, Valence (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 15/942,412

(22) Filed: Mar. 30, 2018

(65) Prior Publication Data

US 2018/0294727 A1   Oct. 11, 2018

(30) Foreign Application Priority Data

Apr. 6, 2017   (FR) ...................................... 17 00382

(51) Int. Cl.
  *H02M 3/158*   (2006.01)
  *H02M 1/08*   (2006.01)
  *H02M 1/00*   (2006.01)

(52) U.S. Cl.
  CPC ........... *H02M 3/1588* (2013.01); *H02M 1/08* (2013.01); *H02M 3/1582* (2013.01); *H02M 2001/0009* (2013.01); *H02M 2001/0022* (2013.01); *H02M 2001/0025* (2013.01)

(58) Field of Classification Search
  CPC ................. H02M 3/1588; H02M 1/08; H02M 2001/0009; H02M 2001/0038; H02M 3/1582

USPC .................................................. 323/259, 344
See application file for complete search history.

(56) References Cited

U.S. PATENT DOCUMENTS

| | | | |
|---|---|---|---|
| 2012/0170324 A1* | 7/2012 | Fornage | H02M 3/337 363/17 |
| 2012/0275198 A1 | 11/2012 | Cohen | |
| 2014/0197813 A1* | 7/2014 | Umetani | H02M 3/156 323/282 |

OTHER PUBLICATIONS

Tang et. al., Power Factor Correction With Flyback Converter Employing Charge Control, IEEE 1993, pp. 293-298.
Wang et. al., Charge Control of Three-Phase Buck PWM Rectifiers, IEEE 2000, vol. 2, pp. 824-831.
French Patent Application 17 00382, Rapport de Recherche Préliminaire, dated Jan. 12, 2018, 2 pages.

* cited by examiner

*Primary Examiner* — Alex Torres-Rivera
(74) *Attorney, Agent, or Firm* — Soquel Group LLC (57) ABSTRACT

A converter comprising a switch and a control device in "peak charge" mode for generating a command of the switch, and which comprises an error corrector between an output voltage and a reference voltage, a comparison means between a reference charge and a measured charge resulting from the time integration of the current circulating in the switch to develop the command signal, the error signal at the output of the error corrector being a reference power, the control device comprising a conversion unit comprising a divider dividing the reference power by the input voltage to obtain the reference charge.

9 Claims, 5 Drawing Sheets

SWITCHING POWER CONVERTER WITH A MAXIMUM CURRENT MODE CONTROL

CROSS REFERENCE TO RELATED APPLICATIONS

This application claims priority under 35 USC § 119 of French Patent Application No. 17 00382 filed on Apr. 6, 2017.

FIELD OF THE INVENTION

The present invention relates to switching power converters. The invention more particularly relates to peak charge control mode switching power converters.

BACKGROUND OF THE INVENTION

A power switching converter is based on switching controllable switches, which apply a chopped voltage to a filtering circuit made up of inductive and capacitive components. Controlling the opening and closing moments of the or each switch makes it possible, through interaction with the charge connected at the output of the converter, to generate a greater or smaller voltage and/or current at the output of the converter.

Figure 1:
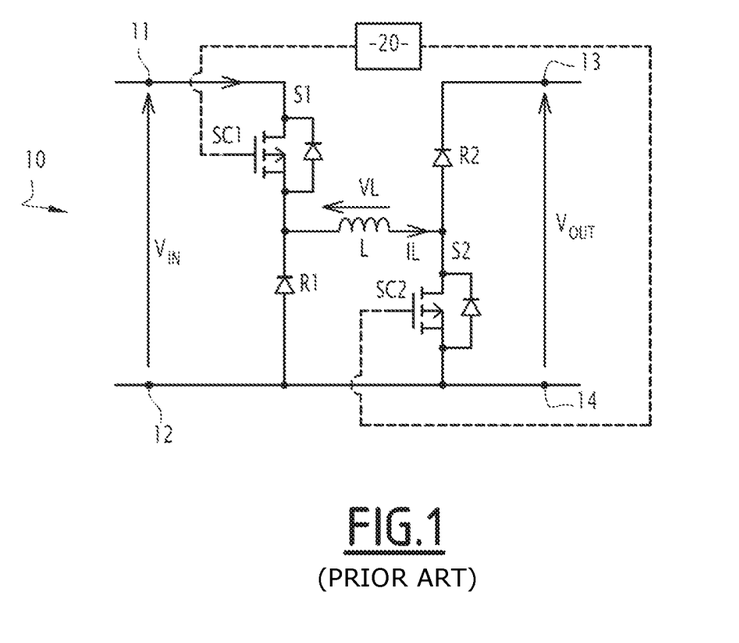
FIG. 1 is a diagram of a "Buck-Boost" converter.

FIG. 1 for example shows a passive rectification non-inverter converter 10 according to a "Buck-Boost" topology.

The known converter has two controllable switches S1 and S2 (preferably MOSFET switches); two passive rectifiers R1 and R2 (preferably diodes); an inductive L switching component (preferably an inductance).

It is by varying the duty ratio of the command signal SC1 of the transistor S1 and that of the command signal SC2 of the transistor S2 that the current IL in the inductance L is adjusted and, consequently, the output voltage Vout across the output terminals 13 and 14.

The fact that the rectification is passive, i.e. done by diodes and not transistors, makes the converter unidirectional, preventing negative currents in the inductance L and making it possible to operate in intermittent flow.

Figure 2:
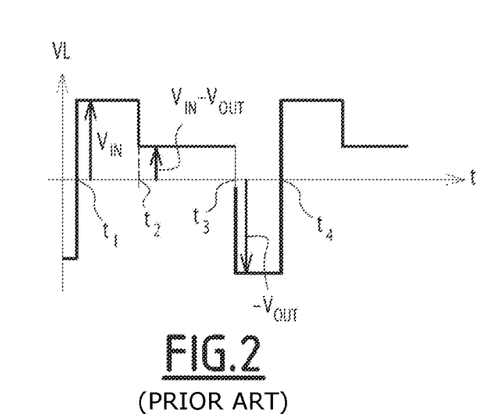
FIGS. 2 and 3 are respectively graphs of the evolution over time of the voltage and current across the terminals of the inductance of the converter of FIG. 1 in the case where the input voltage is higher than the output voltage of the converter.
Figure 3:
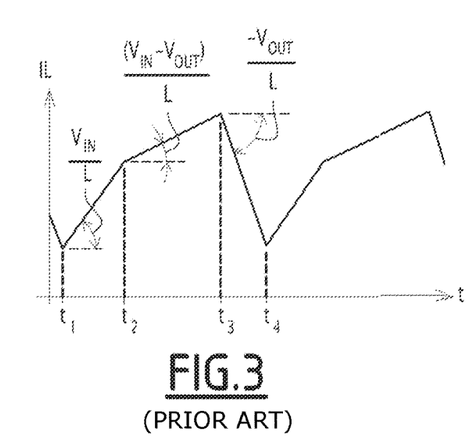
Figure 4:
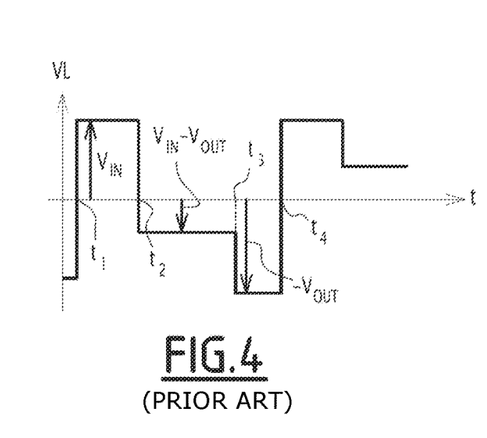
FIGS. 4 and 5 are respectively graphs of the evolution over time of the voltage and current across the terminals of the inductance of the converter of FIG. 1 in the case where the input voltage is lower than the output voltage of the converter.
Figure 5:
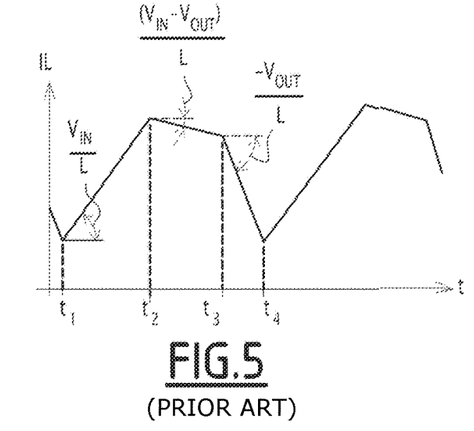

The operating phases of the converter 10 for a continuous flow, i.e., for a large enough charge connected to the output, such that the current IL through the inductance L is not canceled out, are shown as a function of time t in FIGS. 2 and 4 for the voltage VL across the terminals of the inductance L and in FIGS. 3 and 5 for the current IL through the inductance L.

"Boost" phase: between moments t1 and t2, the transistors S1 and S2 are both commanded to close. The input voltage Vin, across the terminals 11 and 12, is therefore applied to the inductance L. The voltage VL being positive, the current IL increases.

"Buck" phase: between moments t2 and t3, the switch S2 then being commanded to open, the rectifier R2 becomes on. It is the difference between the input voltage Vin and output voltage Vout that is applied to the inductance L. As a function of the difference between these voltages, the voltage applied to the inductance will be positive (FIG. 2) or negative (FIG. 4). The current IL will therefore increase (FIG. 3) or decrease (FIG. 5).

"Free-wheeling" phase: between moments t3 and t4, the two switches S1 and S2 are commanded to open. The rectifiers R1 and R2 are then both on. The output voltage Vout is then applied in reverse on the inductance L. The current IL then decreases.

Considering that the state is steady, the current at the beginning of the "Buck" phase is equal to the current at the end of the "free-wheeling" phase and the phases follow one another periodically.

The converter 10 includes a control device 20 making it possible to determine the moment at which to command the closing and the moment at which to command the opening of the transistors S1 and S2, and to generate the command signals SC1 and SC2 to be applied to the transistors S1 and S2, respectively.

Hereinafter, it is considered that the converter is controlled continuously using the principle described in patent EP 2,432,108 A1. Thus, the switch S2 is commanded by the control device 20 continuously as a function of the input voltage Vin, while the switch S1 is controlled by the control device 20 continuously as a function of the output voltage Vout. The switches S1 and S2 therefore work at duty ratios different from zero and one. In other words, they operate continuously in switching, irrespective of the ratio of the input and output voltages, whether the converter raises or lowers the voltage. Hereinafter, we more particularly examine the switch S1 and the development of the command signal SC1.

To command the first switch S1, the control device 20 includes an error corrector 22 on the output voltage Vout relative to a reference voltage Vcons. The output signal of the error corrector does not directly control the transistor S1, but constitutes a reference signal Scons for a current control loop.

The current control loop making it possible to slave the current circulating in the transistor S1 on the reference signal Scons can in particular be done using a "peak current" control mode or a "peak charge" control mode (also called "integrated current"). These two principles are illustrated in the same FIG. 6.

According to the "peak current" mode, the control device 20 of the converter makes it possible to slave the peak value of the current in the transistor S1 and the inductance L on the reference signal Scons. The opening of the transistor S1 is then triggered by a comparator 24, at the end of the comparison of a measurement of the current Imes circuiting in the transistor S1 with the reference signal Scons. The measurement of the current Imes is done by a current sensor 25 and applied on one of the input tabs of the comparator 24 (dotted lines in FIG. 6). The output signal of the comparator 24 is applied on the reversed reset input of a latch 28 controlled by a clock signal CLK, which makes it possible to place the output Q of the latch 28 in the high state "1" at each pulse edge of the clock signal CLK. The output Q is then switched into the low state "0" when the output signal of the comparator 24 is in the low state "0". The output signal of the latch 28 constitutes the command signal SC1 of the transistor S1.

According to the "peak charge" mode, the control device 20 of the converter makes it possible to slave the peak value of the charge in the transistor S1 and the inductance L on the reference signal Scons. The opening of the transistor S1 is then triggered by a comparator 24, at the end of the comparison of a measurement of the charge Qmes circuiting in the transistor S1 with the reference signal Scons. The measurement of the charge Qmes is obtained by a time integrator 26 of the measurement of the current Imes delivered by the sensor 25. The time integrator 26 is reset to zero upon each switching period, by the clock signal CLK, which also paces the switching by the latch 28. The measurement of the charge Qmes is applied on one of the input tabs of the comparator 24 (solid lines in FIG. 6). The output signal of the comparator 24 is applied on the reversed reset input of the latch 28 controlled by a clock signal CLK, which makes it possible to place the output Q of the latch 28 in the high state "1" at each pulse edge of the clock signal CLK. The output Q is then switched into the low state "0" when the output signal of the comparator 24 is in the low state "0". The output signal of the latch 28 again constitutes the command signal SC1 of the transistor S1.

The implementation of a control in "peak current" mode for controlling the converter 10 is, however, problematic for an input voltage Vin lower than the output voltage Vout. Indeed, the current IL being decreasing in the "Buck" phase that precedes the opening of the switch S1, control in "peak current" mode cannot be done directly. It is in fact necessary to add a compensating ramp. Control in "peak current" mode with a low input voltage is then comparable to a control in "voltage" mode, in which the compensating ramp is predominant relative to the ramp of the measured current.

Furthermore, independently of the topology of the controlled converter, control in "peak current" mode has a certain number of drawbacks:

i) Imprecision of the current or power limitation: in the majority of cases, the "peak current" mode is used to produce a limitation of the current or power by limiting the reference signal. But the measurement of the current Imes is not representative of the mean input current (and therefore the input power) or the mean output current (and therefore the output power). Indeed, if we take the example of a converter with a "Buck" topology, for a same peak current, the value of the mean current depends on the amplitude of the current waviness, i.e., input and output voltage values;

ii) Negative input impedance: a switching converter is always accompanied by input filtering, especially when it is connected to an input network. Indeed, the equipment using this converter is subject to standardized EMC constraints, which are reflected by frequency templates of the input current. To respect these frequency templates, one or several LC-type passive filters are added upstream from the input capacitor of the converter for maximal smoothing of the input current and decreasing the chopped current harmonics so as to respect the frequency template.

The Middlebrook criterion then makes it possible to ensure, simply, the stability of the assembly made up of the filter and the converter: the output impedance of the filter must be lower than the input impedance of the converter.

However, for a converter controlled in "peak current" mode, the converter has a negative impedance at low frequency. Indeed, for the same reference signal limiting the peak current, when the input voltage decreases, the mean input current increases.

This may then raise compatibility problems with the filter and requires significant damping of the filter, in order for the resonance thereof not to cause an output impedance of the filter greater than the input impedance of the converter.

This damping is generally bulky, whether in terms of capacitors (it takes a damping capacitor volume at least equivalent to that of the filter to be damped) or resistances (the resistances must be able to withstand the normative susceptibility tests, in particular when the filter is excited at its resonance frequency).

iii) Compatibility with an impedance input network (resistive and/or inductive): the generalization of the composite structures of aircrafts goes hand-in-hand with increasing the impedance of the distribution cabling of electrical grids. Indeed, the fuselage of the aircraft no longer being conducting, it is no longer possible to have the current returns pass through and thus requires the use of return conductors. These conductors are more resistive than the structure, since they offer fewer sections. As a comparison, the cabling impedance (outgoing and incoming) between an aircraft with a metal structure and an aircraft with a carbon structure increases by 67%.

A high line impedance does not work well with a negative input impedance. Indeed, the more the current requested by the converter increases, the greater the voltage drop between the source and the converter is, therefore the converter will demand more current to continue operating at a constant power. This running away is primarily bothersome when starting up the converter, being able to cause stopping/restarting phenomena.

Control in "peak charge" mode makes it possible to avoid these problems associated with control in "peak current" mode. This is why control in "peak charge" mode is largely implemented in the state of the art.

This is primarily due to the fact that the regulation is done not directly on the value of the current in the switch S1, but on the value integrated over time of this current, from the closing of the switch S1 (the integration being reset upon opening of the switch S1, so as to restart at zero at the beginning of each cycle), and that the converter is unidirectional, such that its charge can only increase and such that a control can be done even when the current is not increasing.

Control in "peak charge" mode thus responds to the drawbacks of control in "peak current" mode listed above.

Electrically, the integrated current is homogeneous at a charge. For the example of a "Buck-Boost" converter, this charge, once averaged over a period, is equal to the mean current applied at the input of the converter. One thus directly controls the mean input current of the converter, independently of the waviness of the current in the inductance, i.e., voltages and duty ratios involved. It is therefore possible to have a very precise limitation of the input current.

When considering the reference signal Scons as fixed, the "Buck-Boost" converter behaves like a constant-current charge up to a certain threshold frequency. Approaching this threshold frequency, depending on the switching frequency, but also the control circuits, the input impedance of the converter decreases slightly, before increasing. Thus, while for the "peak current" control mode, the initial slope of the input impedance decreases, which requires damping of the resonance of the upstream filtering to respect the Middlebrook criterion, for the "peak charge" control mode, the initial slope of the impedance being zero, it is easier to respect the Middlebrook stability criterion. It is then possible to reduce the damping of the filtering upstream from the input of the converter, with the advantage of physically reducing its size.

Lastly, in "peak charge" mode, the converter has a real current limitation, and not a power limitation like with the "peak current" mode. The Pin-Vin limit characteristic of the converter can go through the 0-0 point. It should be noted that the Pin-Vin limit characteristic is bounded by a power limitation, supplanting the current limitation for high input voltages. Due to this characteristic, it is possible to have a balance between the impedance of the grid and the input impedance of the converter.

However, control in the "peak charge" mode also has drawbacks. The benefits for the input impedance of the converter and therefore the input filter placed upstream from the latter are only valid for a fixed reference signal Scons. In reality, to regulate the output voltage Vout of the converter, the reference signal Scons is not fixed, but derived from the error corrector 22 between the output voltage Vout and the reference voltage Vcons.

This direct slaving on the output voltage Vout of the reference signal Scons, corresponding to a reference peak charge, raises the following problems:

The slaved property being the reference peak charge, i.e. ultimately the input current of the converter, a power limitation of the converter cannot be done directly. The positive saturation of the error corrector corresponds to a current limitation, but not a power limitation. It is therefore necessary to implement an additional circuit to perform the power limitation function;

as previously stated, in order for the converter to be comparable to a constant-current charge and to obtain the advantages thereof for dimensioning of the upstream filter, the reference peak charge must be constant (or at the very least have a very low frequency). This means that the error corrector must have a very low cutoff frequency. This low cutoff frequency is not compatible with high-voltage spikes that may occur at the input of the converter. As an example, the abnormal surge voltage defined in avionics standard DO-160G is a spike of 28 V to 84 V with a pulse edge below 1 ms. Likewise, the currents induced by lightning strikes create rapid voltage pulse edges. If the input voltage increases while the reference peak charge (i.e., the input current) remains constant, then the converter will allow more power to pass, leading to an overvoltage at the output.

SUMMARY OF THE DESCRIPTION

The aim of the present invention is to resolve these problems affecting control in "peak charge" mode.

To that end, the invention relates to a switching power converter comprising a controllable switch and a control device for generating a command signal for opening and closing moments of the controllable switch, said control device being of the "peak charge" control device type and comprising: an error corrector for comparing an output voltage of the converter and a reference voltage; a comparison means between a reference charge and a measured charge resulting from the time integration of a measurement of a current circuit leading in the controllable switch to develop the command signal, characterized in that, the error signal at the output of the error corrector being a reference power, said control device further includes a conversion unit capable of developing the reference charge from the reference power, the conversion unit comprising a divider capable of dividing the reference power by a voltage corresponding to the input voltage of the converter to obtain the reference charge.

According to particular embodiments, this converter comprises one or more of the following features, considered alone or according to any technically possible combinations:

a capacitor cyclically charged by a current proportional to the voltage corresponding to the input voltage;

a comparator capable of comparing a voltage across the terminals of the capacitor with the reference power so as to obtain a periodic logic signal whose pulse width is proportional to the quotient of the reference power by the input voltage;

an assembly for filtering the logic signal so as to obtain a reference charge whose mean value is proportional to the ratio of the reference power by the input voltage;

the conversion unit comprises, upstream from the divider, a power limiter and/or downstream from the divider, a charge limiter;

the divider of the conversion unit comprises a means for filtering the input voltage capable of allowing increasing voltage spikes to pass, while filtering the decreasing voltage spikes;

the means for filtering the input voltage of the divider comprises a diode and a low-pass filter;

the comparison means comprises a comparator using, as input, the measured charge and the reference charge developed at the output of the conversion unit, and a latch, an output of the comparator being connected to an input of the latch, a clock signal being applied to the other input of the latch, and the signal delivered on an output of the latch corresponding to the command signal.

the control device comprises a current sensor able to measure the current circulating in the controllable switch, a time integrator capable of temporally integrating the measurement delivered by the sensor to deliver, as output, a measurement of the charge applied to the comparator, the time integrator being reset upon each switching period of the converter by the clock signal that paces the latch;

the converter having a topology selected from among a "Buck" topology, a "Boost" topology, a "Buck-Boost" topology, a "non-reversing Buck-Boost" topology, a "Flyback" topology and a "Forward" topology;

the commanded switch is a transistor.

BRIEF DESCRIPTION OF THE DRAWINGS

The invention and its advantages will be better understood upon reading the following detailed description of one particular embodiment, provided solely as a non-limiting example, this description being done in reference to the appended drawings, in which.

DETAILED DESCRIPTION

Figure 6:
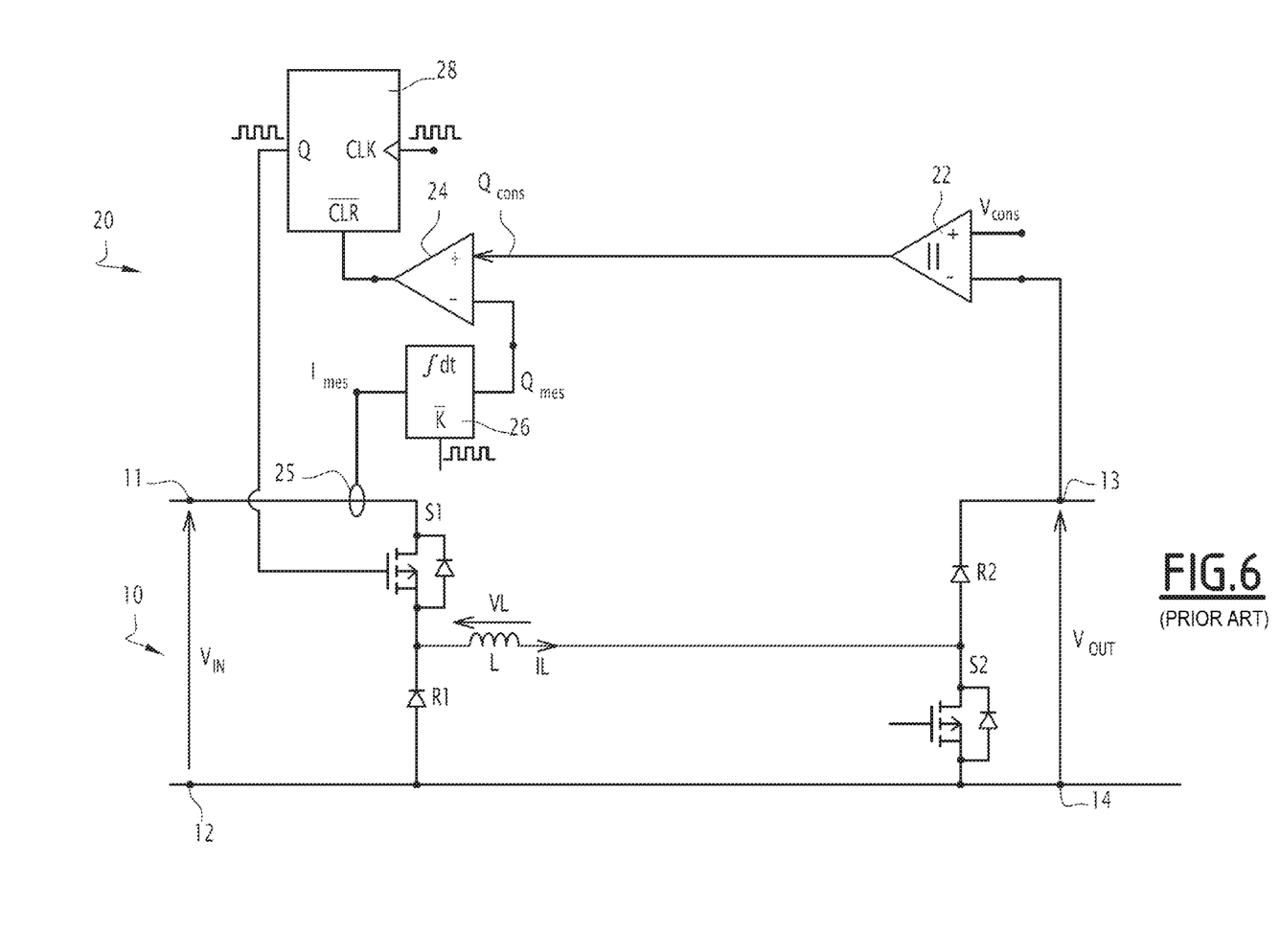
FIG. 6 is an illustration of the converter of FIG. 1 equipped with a control device in "peak current" mode or in "peak charge" mode depending on the state of the art.
Figure 7:
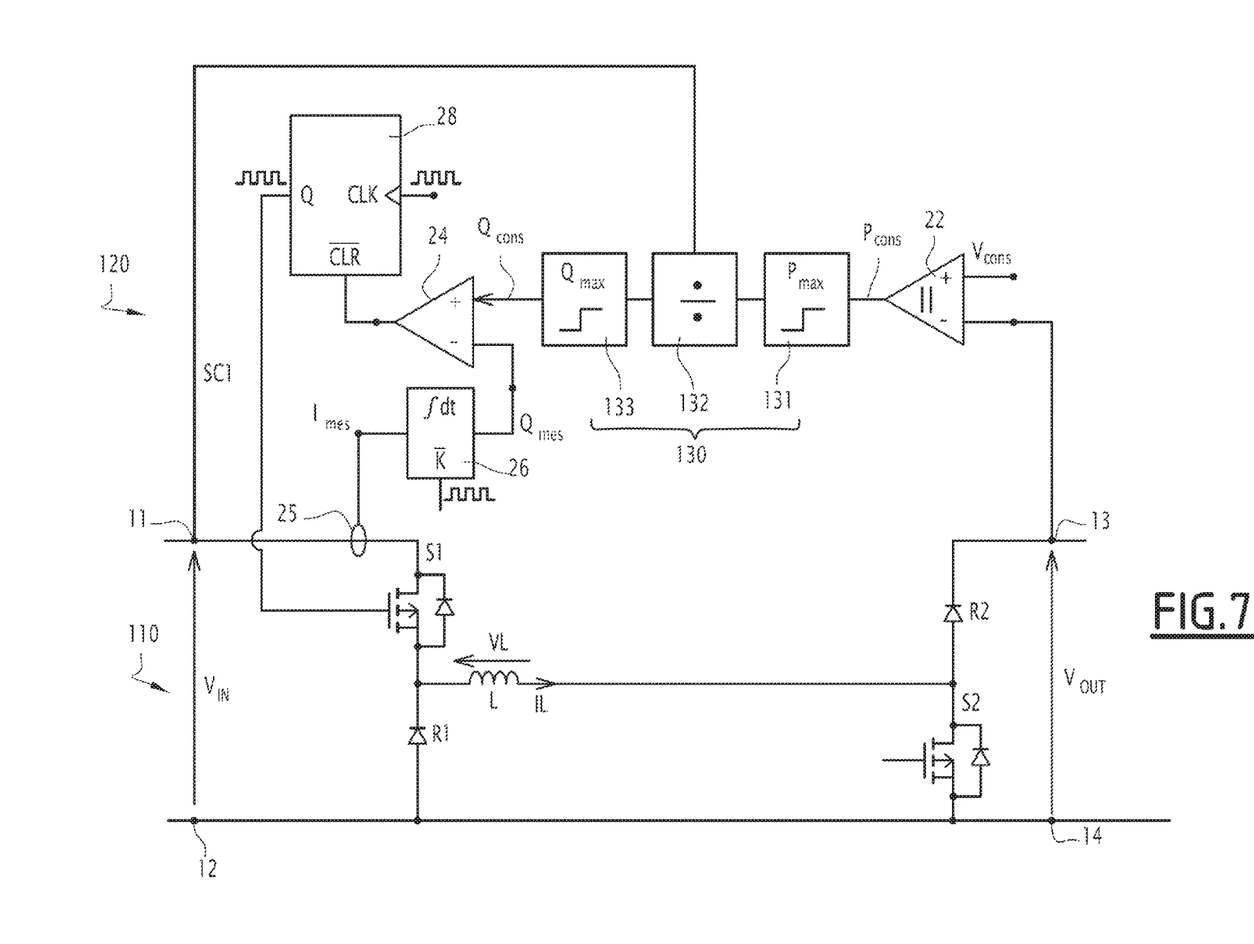
FIG. 7 is a block diagram of the converter according to the invention.

FIG. 7 shows a converter according to one preferred embodiment of the invention. The elements of FIG. 7 that are identical to elements of FIG. 6 are identified using a same reference.

The converter 110 is a converter of the non-reversing "Buck-Boost" type with passive rectification.

The converter part strictly speaking of the converter 110 is identical to that of the converter of FIG. 6.

The control part of the converter 110, made up of the control device 120, makes it possible to perform control in "peak charge" mode. The control device 120 differs from the control device 20 of FIG. 6 only by the presence of a conversion unit 130 able to convert the reference signal delivered at the output of the error corrector into a converted reference signal applied to the input of the comparator 24.

The conversion applied by the conversion unit 130 consists of dividing the reference signal by the input voltage Vin.

Thus, the comparator 24 comparing the measured charge Qmes to the converted reference signal, the latter corresponds to a reference peak charge. It is called the reference peak charge Qcons hereinafter.

Since the reference peak charge results from the ratio of the reference signal to an input voltage, the reference signal corresponds to a peak input power. It is called peak reference power Pcons hereinafter.

Thus, the conversion unit 130 comprises a divider 132 able to perform, at each moment, the ratio of the reference power Pcons by the input voltage Vin to deliver, as output, the reference peak charge Qcons.

Advantageously, as shown in FIG. 7, the conversion unit 130 comprises, upstream from the divider 132, a power limiter 131 able to clip the reference power Pcons when it exceeds a threshold value Pmax.

Also advantageously, as also shown in FIG. 7, the conversion unit 130 comprises, downstream from the divider 132, a charge limiter 133 able to clip the reference peak charge Qcons when it exceeds a threshold value Qmax.

The power and/or charge limiters 131, 133 make it possible to limit the power and/or current.

Figure 8:
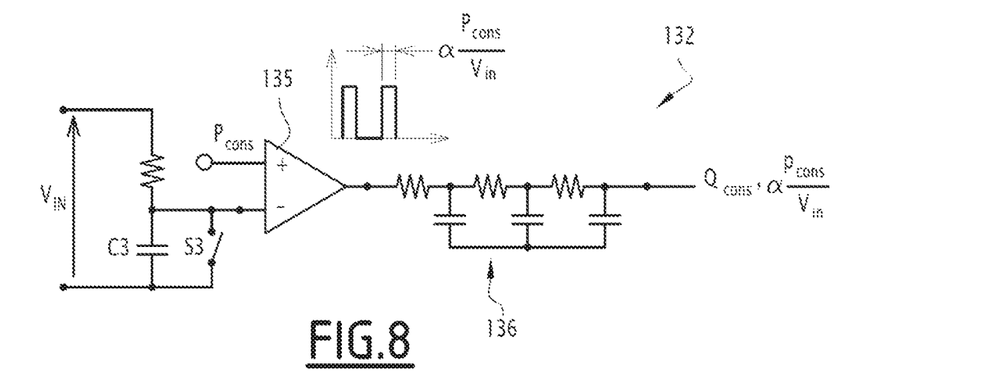
FIG. 8 is one possible embodiment of the divider of the converter of FIG. 7.

FIG. 8 shows an example embodiment of the divider 132 of FIG. 7 in analog electronics. The divider 132 includes a capacitor C3, which is cyclically charged (by the opening and closing of the controllable switch S3 commanded periodically at a frequency compatible with the desired assembly bandwidth) by a current proportional to the input voltage Vin. The voltage across the terminals of the capacitor C3 is then a ramp whose slope is proportional to the input voltage Vin. A comparator 135 makes it possible to compare the voltage across the terminals of the capacitor C3 to the reference power Pcons. A periodic logic signal is thus obtained at the output of the comparator 135 whose pulse width is proportional to the quotient of the reference power Pcons by the input voltage Vin. The logic signal is lastly filtered by an assembly 136, made up of resistances in series and capacitors in parallel, in order to obtain an analog signal whose mean value is proportional to the ratio of the reference power Pcons by the input voltage Vin. This is the signal that constitutes the reference peak charge Qcons.

It is particularly advantageous, in particular to retain the advantages regarding sizing of the filter upstream from the input of the converter, to introduce filtering of the input voltage Vin at the input of the divider, which allows the increasing voltage spikes to pass, while filtering the decreasing voltage spikes. A reference with asymmetrical dynamics is thus obtained and the converter has both a low bandwidth for negative voltage spikes and a high bandwidth for positive voltage spikes.

Figure 9:
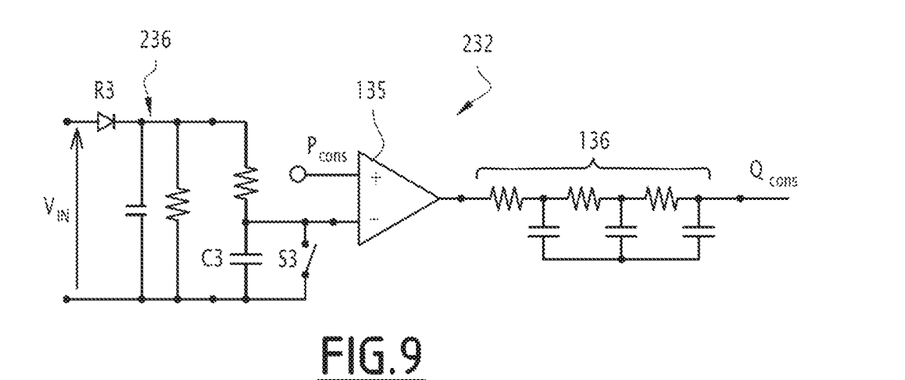
FIG. 9 is another possible embodiment of the divider of the converter of FIG. 7.

An example embodiment of a divider 232 making it possible to give the converter this property is shown in FIG. 9. The mounting of the divider 232 is identical to that of the divider 132 of FIG. 8, except that it further comprises a diode R3 and a low-pass filter 236.

The diode R3 at the input of the assembly introduces asymmetry into the filtering of the input voltage Vin by the low-pass filter 236, before it is applied to the capacitor C3: The increasing spikes are not filtered, while the decreasing spikes are.

More specifically, in a static state, the low-pass filtering is indeed done. The cutoff frequency is chosen (by selecting the values of the resistance and the capacitor making up the low-pass filter 236) to be low enough to retain all of the advantages of the "peak charge" control, in particular in terms of operation for the compatibility between impedances with the filter upstream from the input of the converter.

In case of increasing input voltage spike, the filtering by the low-pass filter 236 is exceeded and the reference peak charge Qcons is decreased, so as to retain an operation at a constant power and prevent the converter from absorbing too much power. Overvoltages are thus avoided at the output, while having a regulation of the output voltage with a bandwidth.

In case of decreasing input voltage spike, the filtering by the low-pass filter 236 causes a slower decrease of the reference peak charge Qcons. The lack of transferred power will then be compensated by the reserve power capacitors of the equipment.

The present invention has been described in detail for the case of a converter using "Buck-Boost" topology, but one skilled in the art will understand that the principle of control in the improved "peak charge" mode described here is also valid for non-insulated converters in "Boost" and "non-reversing Buck-Boost" topologies, or insulated converters with "Forward" and "Flyback" topologies.

Lastly, all of the described cases illustrate converters with passive rectification, but the control principle is also valid for converters using active rectification, also called synchronous rectification, the switching diodes R1 and R2 being replaced by controllable switches.

The invention claimed is:

1. A switching power converter comprising:
   a controllable switch; and
   a control device for generating a command signal of the controllable switch at opening and closing moments, said control device being a peak charge control mode device and comprising:
      an error corrector for comparing an output voltage of the switching power converter and a reference voltage; and
      a comparison means between a reference charge and a measured charge resulting from a time integration of a measurement of a current circulating in the controllable switch to obtain the command signal,
   wherein, an error signal at the output of the error corrector being a reference power, the control device further includes a conversion unit outputting the reference charge from the reference power, the conversion unit comprising a divider dividing the reference power by a voltage corresponding to the input voltage of the switching power converter to obtain the reference charge.

2. The switching power converter according to claim 1, wherein the divider comprises:
   a capacitor cyclically charged by a current proportional to the voltage corresponding to the input voltage;
   a comparator comparing a voltage across the terminals of the capacitor with the reference power so as to obtain a periodic logic signal, a pulse width thereof being proportional to a quotient of the reference power by the input voltage; and an assembly for filtering the logic signal so as to obtain a reference charge whose mean value is proportional to a ratio of the reference power by the input voltage.

3. The switching power converter according to claim 1, wherein the conversion unit comprises, upstream from the divider, a power limiter and/or downstream from the divider, a charge limiter.

4. The switching power converter according to claim 1, wherein the divider of the conversion unit comprises a filter of the input voltage, the filter allowing an increasing voltage spike to pass, while filtering out a decreasing voltage spike.

5. The switching power converter according to claim 4, wherein the filter of the input voltage of the divider comprises a diode and a low-pass filter.

6. The switching power converter according to claim 1, wherein the comparison means comprises:
   a comparator using, as input, the measured charge and the reference charge output by the conversion unit; and
   a latch, an output of the comparator being connected to a first input of the latch, a clock signal being applied to a second input of the latch, and a signal delivered on an output of the latch corresponding to the command signal.

7. The switching power converter according to claim 6, wherein the control device comprises:
   a current sensor measuring the current circulating in the controllable switch; and
   a time integrator integrating over time the measurement delivered by the sensor, in order to output the measured charge applied to the comparator, the time integrator being reset upon each switching period of the switching power converter by the clock signal that paces the latch.

8. The switching power converter according to claim 1, the switching power converter having a topology selected from among a Buck topology, a Boost topology, a Buck-Boost topology, a non-reversing Buck-Boost topology, a Flyback topology and a Forward topology.

9. The switching power converter according to claim 1, wherein the controlled switch is a transistor.

* * * * *